United States Patent
Kumar

(10) Patent No.: US 7,272,644 B1
(45) Date of Patent: Sep. 18, 2007

(54) INTERNET BASED NETWORK TOPOLOGY DISCOVERY

(75) Inventor: Arvind Kumar, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 738 days.

(21) Appl. No.: 09/675,622

(22) Filed: Sep. 29, 2000

(51) Int. Cl.
*G06F 15/173* (2006.01)
*G06F 15/177* (2006.01)

(52) U.S. Cl. ........................ 709/223; 715/736

(58) Field of Classification Search ............... 709/203, 709/217, 218, 219, 220, 223, 224, 229; 715/734, 715/736
See application file for complete search history.

(56) References Cited

U.S. PATENT DOCUMENTS

| | | | |
|---|---|---|---|
| 5,185,860 A * | 2/1993 | Wu | 709/224 |
| 5,473,599 A * | 12/1995 | Li et al. | 370/219 |
| 5,734,642 A * | 3/1998 | Vaishnavi et al. | 370/255 |
| 5,909,550 A * | 6/1999 | Shankar et al. | 709/227 |
| 6,253,337 B1 * | 6/2001 | Maloney et al. | 714/38 |
| 6,466,971 B1 * | 10/2002 | Humpleman et al. | 709/220 |
| 6,581,094 B1 * | 6/2003 | Gao | 709/220 |
| 6,615,201 B1 * | 9/2003 | Seshadri et al. | 707/2 |
| 6,789,077 B1 * | 9/2004 | Slaughter et al. | 707/10 |
| 6,862,594 B1 * | 3/2005 | Saulpaugh et al. | 707/10 |
| 6,868,447 B1 * | 3/2005 | Slaughter et al. | 709/225 |

FOREIGN PATENT DOCUMENTS

WO    WO 01/40938    *   6/2001

OTHER PUBLICATIONS

ISO/IEC JTC SC 25WG1 N 887, Interconnect of Information Technology Equipment Home Electronic Systems, Title: VESA home Network Architecture, Nov. 11, 1999, pp. 1-27.*
An architecture for a secure service discovery service, Czerwinski, S.E., et. al., Intl. Conf. on Mobile Computing & Networking, Proc. of the 5th annual ACM/IEEE, Wash, p. 24-35, 1999, ISBN 1-58113-142-9.*
Service discovery in the future for mobile commerce, Chakraborty, D., et. al., Crossroads, Dec. 2000.*
Automatic discovery of thin servers: SLP, Jini and the SLP-Jini Bridge☐☐Automatic discovery of thin servers: SLP, Jini and the SLP-Jini Bridge, Guttman, E., et. al., The 25th Annual Conf. of the IEEE, vol. 2, Nov. 29-Dec. 3, 1999, p. 722-727.*

(Continued)

*Primary Examiner*—Beatriz Prieto
(74) *Attorney, Agent, or Firm*—Blakely, Sokoloff, Taylor & Zafman LLP

(57) ABSTRACT

A method and apparatus for internet based network topology discovery. Extensible Markup Language (XML) based data is used to share the discovery information of devices on a network over Internet transport. XML based search engines are used to search for the discovery information. Discovery information, such as identification, location, or capability data, for example, is stored on the devices of a network in the form of XML documents. Network topology maps may be created based on the information discovered.

6 Claims, 5 Drawing Sheets

OTHER PUBLICATIONS

Goland, Yaron, Y., Simple Service Discovery Protocol/1.0 Operating without an Arbiter, Internet Engineering Task Force, draft_cai_ssdp_v1_03.txt, Oct. 28, 1999, 18 pages.

Microsoft Systems Management Server 2.0 Resource Guide, Chapter 8—Using Network Discovery Architecture, http://www.microsoft.com/TechNet/deploy/smc08.asp, 1999, 17 pages.

Microsoft Visio 2000 Enterprise Edition Tutorials, Network Diagramming Solutions—Discovering a Network with AutoDiscovery Technology, Steps 1-4, http://www.microsoft.com/presspass/guides/visio/professional/enttutorials/autodiscovery.asp, 2000, 3 pages.

Microsoft Visio 2000 Enterprise Edition Tutorials, Network Diagramming Solutions—Discovering a Network with AutoDiscovery Technology, Steps 5-9, http://www.microsoft.com/presspass/guides/visio/professional/enttutorials/step5nt1.asp, 2000, 3 pages.

Microsoft Visio 2000 Enterprise Edition Tutorials, Network Diagramming Solutions—Diagramming a Discovered Network, http://www.microsoft.com/presspass/guides/visio/professional/enttutorials/diagramming_network.asp, 2000, 2 pages.

Microsoft Visio 2000 Enterprise Edition Tutorials, Network Diagramming Solutions—Diagramming a Discovered Network With AutoLayout, http://www.microsoft.com/presspass/guides/visio/professional/enttutorials/diagramming_network_w_layout.asp, 2000, 2 pages.

Microsoft Visio 2000 Enterprise Edition Tutorials, Network Diagramming Solutions—Updating the Diagram With Guided Updating, http://www.microsoft.com/presspass/guides/visio/professional/enttutorials/guided_updating.asp, 2000, 2 pages.

* cited by examiner

100

| Formulating a discovery information query. |
| --- |
| 102 |

↓

| Sending the discovery information query to an extensible markup language (XML)-based search engine to search for discovery information of at least one network device. |
| --- |
| 104 |

↓

| (Optional) Manipulating discovery information retrieved by the XML-based search engine from a discovery document on the network device. |
| --- |
| 106 |

↓

| (Optional) Displaying the manipulated discovery information. |
| --- |
| 108 |

FIG. 1

```xml
<?xml version="1.0" encoding="UTF-8"?>
<ManagedNode>
    <Name>
        <DisplayName>ComputerX</DisplayName>
        <FullyQualifiedName>example.domain.com</FullyQualifiedName>
    </Name>
    <Address>
        <AddressType>IP</AddressType>
        <AddressValue>11.22.33.44</AddressValue>
    </Address>
    <Address>
        <AddressType>Modem</AddressType>
        <AddressValue>(503) 987-6543</AddressValue>
    </Address>
    <NodeType>
        <Category>Server</Category>
        <Usage>WebHead</Usage>
    </NodeType>
    <Capabilities>
        <ManageSelf>True</ManageSelf>
        <ManageOthers>True</ManageOthers>
    </Capabilities>
    <OtherManagedNodes>
        <ManagedNode>
            <Name>
                <DisplayName>ComputerA</DisplayName>
                <FullyQualifiedName>ComputerA.mydomain.com</FullyQualifiedName>
            </Name>
            <Address>
                <AddressType>IP</AddressType>
                <AddressValue>12.34.56.78</AddressValue>
            </Address>
            <Address>
                <AddressType>Modem</AddressType>
                <AddressValue>(321) 345-6789</AddressValue>
            </Address>
            <NodeType>
                <Category>Server</Category>
                <Usage>Database Server</Usage>
            </NodeType>
            <Capabilities>
                <ManageSelf>True</ManageSelf>
                <ManageOthers>False</ManageOthers>
            </Capabilities>
        </ManagedNode>
        <ManagedNode>
            <Name>
                <DisplayName>ComputerB</DisplayName>
                <FullyQualifiedName>ComputerB.mydomain.com</FullyQualifiedName>
            </Name>
            <Address>
                <AddressType>IP</AddressType>
                <AddressValue>12.34.56.01</AddressValue>
            </Address>
            <NodeType>
                <Category>Desktop</Category>
                <Usage>Client System</Usage>
            </NodeType>
            <Capabilities>
                <ManageSelf>True</ManageSelf>
                <ManageOthers>False</ManageOthers>
            </Capabilities>
        </ManagedNode>
    </OtherManagedNodes>
</ManagedNode>
```

200 — (document block marker)
210 — `<ManageOthers>True</ManageOthers>`
220 — `<OtherManagedNodes>` block

FIG. 4

| Managed Node Name | Managed Node Capabilities. ManageSelf | Managed Node Capabilities. ManageOthers | Other Managed Nodes. Managed Nodes |
|---|---|---|---|
| A | Yes | No | |
| B | Yes | No | |
| C | No | No | |
| D | Yes | No | |
| E | No | No | |
| X | No | Yes | A<br>C |
| Y | No | Yes | B<br>E |
| Z | No | Yes | B<br>C<br>D |

FIG. 5

| Managed System | Reachable through |
|---|---|
| A | Direct<br>Through X |
| B | Direct<br>Through Y<br>Through Z |
| C | Through X<br>Through Z |
| D | Direct<br>Through Z |
| E | Through Y |

FIG. 6

INTERNET BASED NETWORK TOPOLOGY DISCOVERY

FIELD OF THE INVENTION

This invention relates generally to computer network or systems management and, more particularly, to discovery of network devices.

BACKGROUND OF THE INVENTION

The task of computer network and systems management is challenged with the complexities of the systems networked in variety of ways. With large numbers of connected computers and other devices, it is difficult to manage a network. Many common network management tools use a process called "discovery of the network." Discovery of a network of computers or other devices typically involves finding information about which devices are connected to the network. Among the categories of information discovered are, for example, IP addresses of the devices, types of devices, or capabilities of the devices. Among the networked devices that can be "discovered" are computers, printers, servers, switches, modems, etc.

The discovery data of a network is typically used for network management or administration. The data can be formatted into a table or a network "tree" which can then be displayed or manipulated for network management purposes.

Typical network management tools use various ways to discover the network. Most of these are not scalable and break down for the discovery of systems on the Internet. One example of a network discovery method is commonly referred to as a "ping sweep" method. In the ping sweep method, an operator or network administrator sends individual queries to the network from a console. The queries, or "pings," are messages to the network that are directed to a particular device or group of devices that respond with a return message. One example of a ping sweep network search method requires the network administrator to search by IP addresses, incrementing the last digit (or set of digits) of the IP address, for example, until a particular device with the generated IP address is found. The ping sweep method of network discovery is a time consuming manual process. Network traffic is also increased when the ping sweep method is used. One way to shorten time required for a ping sweep search is to use a broadcast method. Broadcasting a ping sweep, however, also creates added network traffic.

BRIEF DESCRIPTION OF THE DRAWINGS

The present invention is illustrated by way of example, and not limitation, in the figures of the accompanying drawings in which:

FIG. 1 is a flowchart showing one embodiment of a method of the present invention;

FIG. 4 is an example of an XML based document;

FIG. 5 is a table showing an example of discovery information retrieved from a network; and FIG. 6 is a table showing an example of manipulated discovery information.

DETAILED DESCRIPTION

Figure 2:
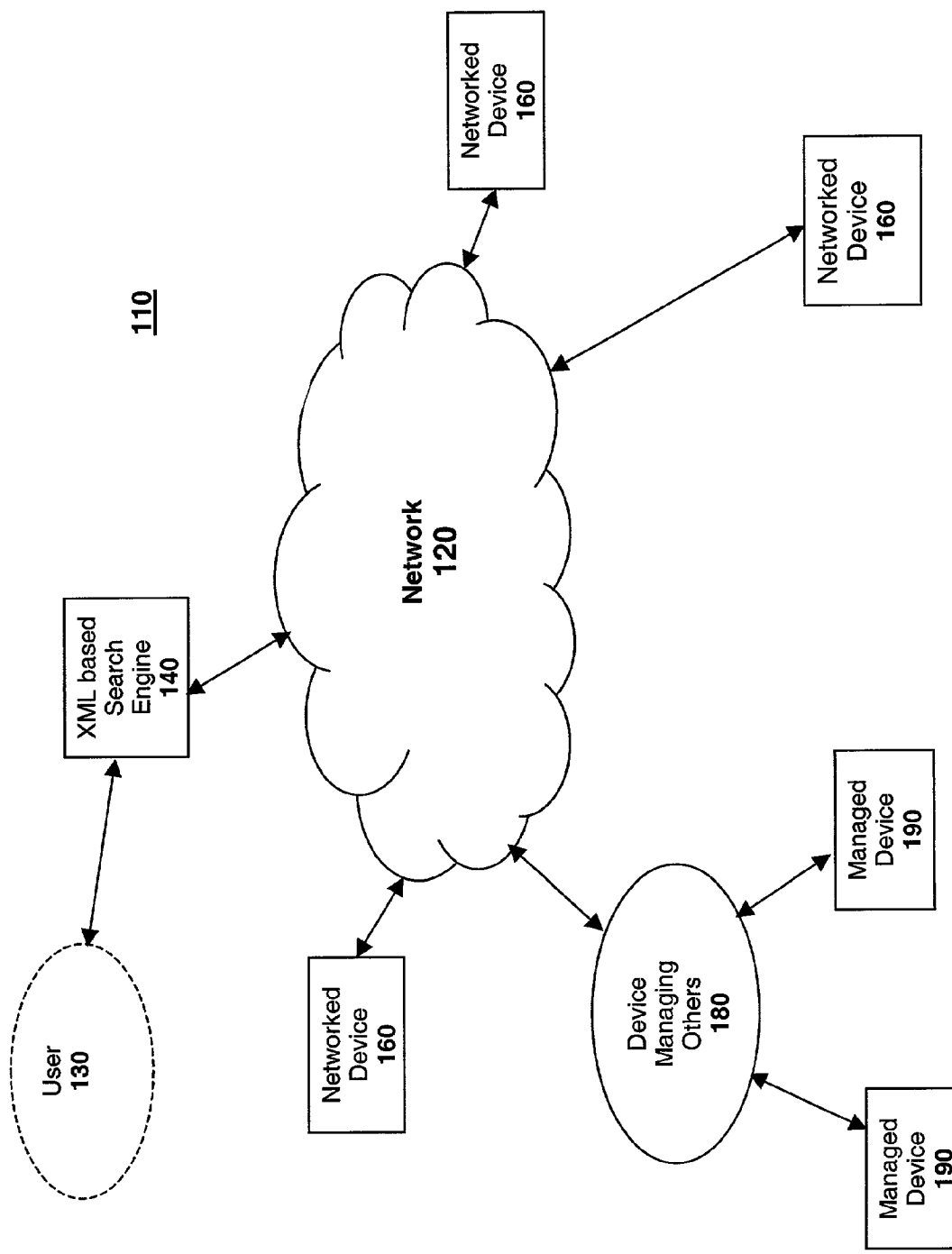
FIG. 2 is a schematic of a network showing an embodiment of a system of the present invention.

The present invention includes unique ways to discover systems or devices on a network. Extensible Markup Language (XML) based data is used to share the discovery information over Internet transport. It allows for an efficient use of Internet content search engines in processing the data. Network topology maps may be created based on the information discovered.

Discovery information, such as identification, location, or capability data, is stored on the devices of a network in the form of XML documents. The discovery information about the networked systems or devices is exchanged using XML/HTTP protocols. Powerful XML based search engines are used for Internet content filtering and retrieval. A combination of these two technologies renders a tool for dynamically building network maps based on the discovery information that is queried and retrieved from the various XML documents on the networked devices. The network nodes can then be further classified based on the node types and other parameters. Specific network maps for a specific management domain can then be rendered.

The particular methods of the invention can described with reference to the flowchart shown in FIG. 1 in which one embodiment of the method 100 constitutes processes and operations represented by block 102 until 108. Embodiments of the method may constitute computer programs made up of computer-executable instructions illustrated as blocks 102 until 108 in FIG. 1.

Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or a produce a result.

Embodiments of the invention can include software stored or transmitted on or by a machine-readable medium. Thus, a machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 1 shows a flowchart of an exemplary method 100 of the present invention in which the various blocks represent operations or procedures to perform the method 100. Block 102 shows the operation of formulating a discovery information query. Block 104 shows the operation of sending the discovery information query to an XML based search engine to search for discovery information of at least one network device.

Formulating the discovery information query can be performed at a console or at one of the devices on the network. For example, a user can formulate and input a query at an end user station such as a personal computer that is connected to the network. The XML based search engine then searches the network for discovery information that is on the device or devices that are being searched. The discovery information is in XML format that is preferably standardized. The XML discovery information is described in further detail below.

Additional operations that can be performed in the method 100 are represented by blocks 106 and 108. Block 106 shows the optional operation of manipulating discovery information retrieved by the XML-based search engine from a discovery document on the network device. As discussed in further detail below, the retrieved XML information can be transposed or manipulated to yield a network map, topology, or tree that can be displayed for the user. Block 108 shows the optional operation of displaying the manipulated discovery information.

FIG. 2 shows an exemplary embodiment of a system 110 of the present invention. System 110 includes a network 120. Network 120 can be any type of network that has a plurality of devices or systems associated with it. Exemplary embodiments of network 120 can include a local area network (LAN) or a wide area network (WAN). For purposes of description of the present invention, it should be noted that the Internet can be considered a collection of networks or a large network by itself.

In the exemplary system 110 shown in FIG. 2, a user 130 formulates a query to send to the network 120 through an XML based search engine 140. The XML based search engine can include a query formulation device in which the user 130 inputs the parameters that are to be searched. The network 120 can be searched for a particular type of device 160 to discover information about the device such as how many of that type of device are connected or operating, the status of all such devices, or the capabilities of particular devices such as whether a particular printer is post-script enabled or has color capability, for example. In another example, the IP addresses can be discovered which can provide information about the location or type of device. Examples of devices 160 or systems that can be discovered include switches, routers, servers, printers, computer, etc.

The system 110 can include devices that manage other devices such as device 180. As shown in FIG. 2, device 180 manages managed devices 190. Managing device 180 can be referred to as a proxy system.

Each device 160, 180, and 190 can include its own XML discovery information. Alternatively, the proxy system or managing device 180 can include XML discovery information about its managed devices 190.

Figure 3:
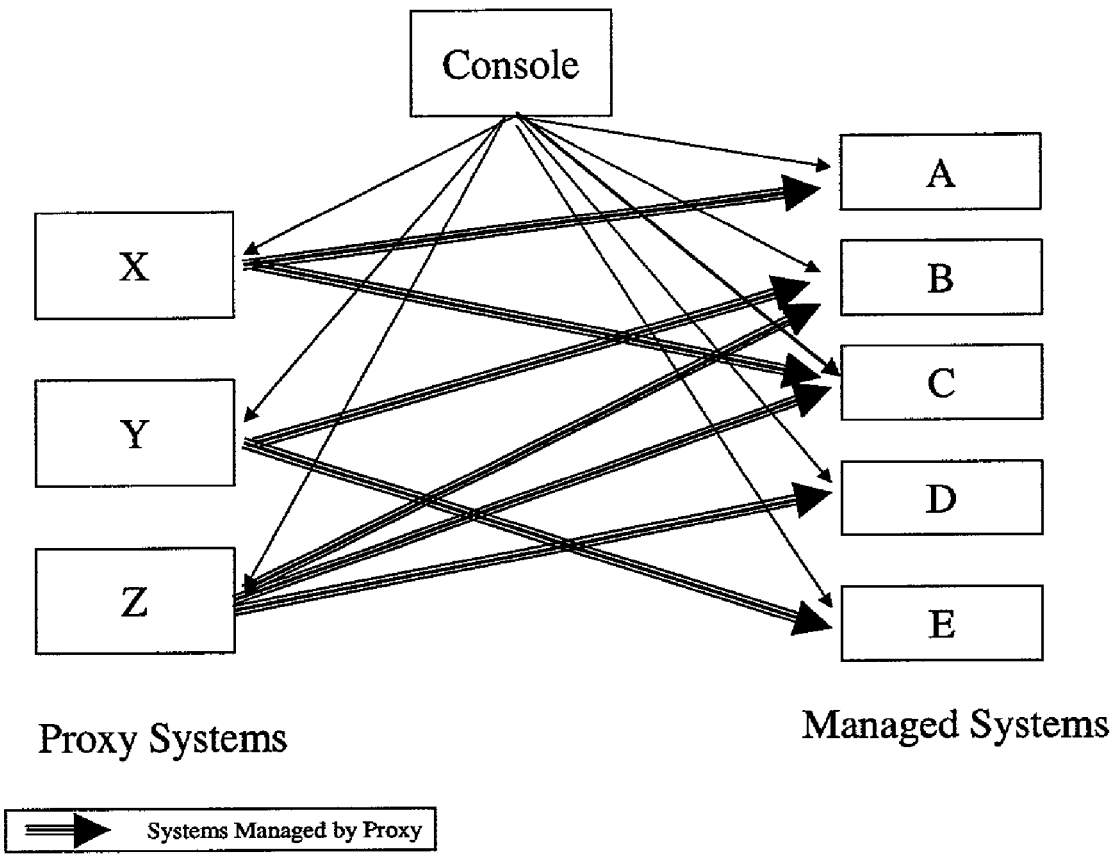
FIG. 3 is a schematic of a network showing another embodiment of a system of the present invention.

FIG. 3 shows another example of a network on which the discovery method of a present invention can be used. The systems A, B, C, D & E are systems on the network that can be managed by the Console system. These systems can either be directly discovered and managed by the console, or they can be managed via a third system (Proxy System). In FIG. 3, Systems X, Y and Z are proxy systems. The broad arrows indicate the systems managed by each proxy system.

It should be noted that the systems in FIG. 3 are identified as "Proxy" and "Managed" systems for illustration purposes only. In the real world, the systems A, B, or C could also act as Proxy for D and E, for example. Systems X and Y could also be the managed systems.

System Discovery Information

Implementation of the present invention preferably includes devices on the network that have their individual discovery/identification data in a standard format. This format is preferably based on Extensible Markup Language (XML). Using XML definitions, a well-structured information content document is published by the devices or systems. Furthermore, defining an XML format allows this information to be routed through HTTP and through firewalls, thus making this information available anywhere and anytime.

FIG. 4 shows an example of an XML file 200 that can be provided on networked devices. XML file 200 can be referred to as a discovery document containing discovery information. The discovery information in XML file 200 can provide many categories of information. For example, line 210 which reads "<ManageOthers>True</ManageOthers>" indicates that the device associated with XML file 200 is a "proxy" system such as a server that manages other devices or systems.

Another example of the discovery information that may by contained in an XML file is represented by the set of lines 220. The set of lines indicated by reference numeral 220 includes discovery information about the devices that are managed by the proxy device. An example of a proxy device or system is a server. Locating the XML file 200 on a proxy device allows the various network devices such as printers, routers, switches, etc. to not have their own XML files. The server, for example, can retrieve the information about the various devices that it manages through current protocols when an XML based network discovery search is performed. The search engine, in this case, need only query the server. If desired, the search engine can be directed to query only particular portions of the XML file. For example, a search can be made that is directed only to the "other managed nodes" section of the XML file 200.

The discovery information is in XML format because XML search engines are used to conduct the network discovery. Many devices currently in use, however, do not include an XML file that includes such information. Modification or replacement of current network devices is not necessary, however, because proxy system can be used to store the information about the various devices.

Making Discovery Information Available

The discovery information encoded in the XML file on the device can be supplied to any consumer of the data. Any protocol for transfer can be used. The Internet standard HyperText Transfer Protocol (HTTP) is very well suited for transferring XML content from one system to another, and is the preferred protocol. The system providing this data can publish a URL containing the XML data. As long as the URL is available somewhere, the specific location of the URL is not important.

For example, the URL containing the XML data for a particular device can be located on a server. An example of such a URL could be http://www.server1.myorg/ManagedCapabilities. In another example, the XML can be embedded on a router and can have the exemplary URL http://192.9.200:34/. In yet another example, a management system which collects data from multiple devices can include the exemplary URL http://www.ManagementServer.myorg/ManagedDevices. In yet another example, a device on "my" local network could include the exemplary URL http://mydevice:80/data.

XML Search Engines

The present invention utilizes power of available Internet search engines. These search engines provide a good way to search for the content on the Internet. Typically, these search engines search for text in the HTML or other text documents, and report results that are the closest match. Some of the search engines provide enhanced capabilities to match keywords (specified in the documents) and thus provide better search results. Building upon this, an XML based search engine searches data under specific XML tags, and thus provides very accurate results.

To illustrate this, a search for ManagedNode/NodeType/Category="Server" will only return the XML documents that contain Server systems. The search engine will limit the search to the above XML tag (as specified by a specific document type definition or "DTD"). Thus, it will not retrieve thousands of documents containing the word "Server."

Manipulating the Discovery Information

The discovery information can contain not only the particular system or device identification data, but also the information about other systems or devices that can be managed through the particular system or device on which the discovery information is stored.

Once the Console system performs an XML search using the search engine, it essentially has the XML documents from all the systems on the managed network. These XML documents are from all the managed systems as well as from the Proxy systems. Of course, the Console system could limit the search to a specific tag, and only retrieve documents of relevance.

FIG. 5 shows an example of a table of information that can be retrieved by the Console system in the process of creating a network map of the network shown in FIG. 3. The next task for the console is to transpose the table of FIG. 5 with the focus on the managed system, and how it can be reached via different alternate paths. This will yield the table shown in FIG. 6.

Based on the table of FIG. 6, the network map in the Console will be updated to reflect that a system is manageable and contains the information necessary to manage the system. For example, referring to FIG. 6, the system B on the network map reflects the status of the system, and the fact that it can be managed directly from the Console. This will be true even if the operating system on system B is crashed/hung. The system is still available through Y or Z. If Y goes down, the system is still available through Z. If Z is also down, then the management launch point is disabled.

These components together create a powerful mechanism to allow network and systems management tools to create a generic network topology map or table, describe the systems on the network, and provide ways to manage these systems effectively.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

formulating an Extensible Markup Language (XML) discovery information query at a console, the console includes a managing device to manage network devices, wherein the XML discovery information query is initiated in one or more of the following ways automatically, and by a client;

sending the XML discovery information query to a plurality of Internet content search engines to facilitate searching of discovery information relevant to the network devices, wherein at least one of the network devices includes an XML discovery information file, wherein at least one of the network devices does not include an XML discovery information file;

in response to sending the XML discovery information query, receiving the following through the plurality of Internet content search engines:

discovery information from the network devices that include an XML discovery information file, and discovery information from a proxy device for the network devices that do not include XML discovery information files; and using the retrieved discovery information to generate a network topology map for the network devices.

2. The method of claim 1, further comprising manipulating the retrieved discovery information.

3. The method of claim 2, further comprising displaying the manipulated discovery information.

4. A tangible machine-readable storage medium having stored thereon data representing sets of instructions which, when executed by a machine, cause the machine to:

formulate an Extensible Markup Language (XML) discovery information query at a console, the console includes a managing device to manage network devices, wherein the XML discovery information query is initiated in one or more of the following ways automatically, and by a client;

send the XML discovery information query to a plurality of Internet content search engines to facilitate searching of discovery information relevant to the network devices, wherein at least one of the network devices includes an XML discovery information file, wherein at least one of the network devices does not include an XML discovery information file;

in response to the sending of the XML discovery information query, receive the following through the plurality of Internet content search engines:

discovery information from the network devices that include an XML discovery information file, and discovery information from a proxy device for the network devices that do not include XML discovery information files; and use the retrieved discovery information to generate a network topology map for the network devices.

5. The tangible machine-readable storage medium of claim 4, wherein the sets of instructions which, when executed by the machine, further causes the machine to manipulate the retrieved discovery information.

6. The tangible machine-readable storage medium of claim 5, wherein the sets of instructions which, when executed by the machine, further cause the machine to display the manipulated discovery information.

* * * * *